Patented Nov. 14, 1933

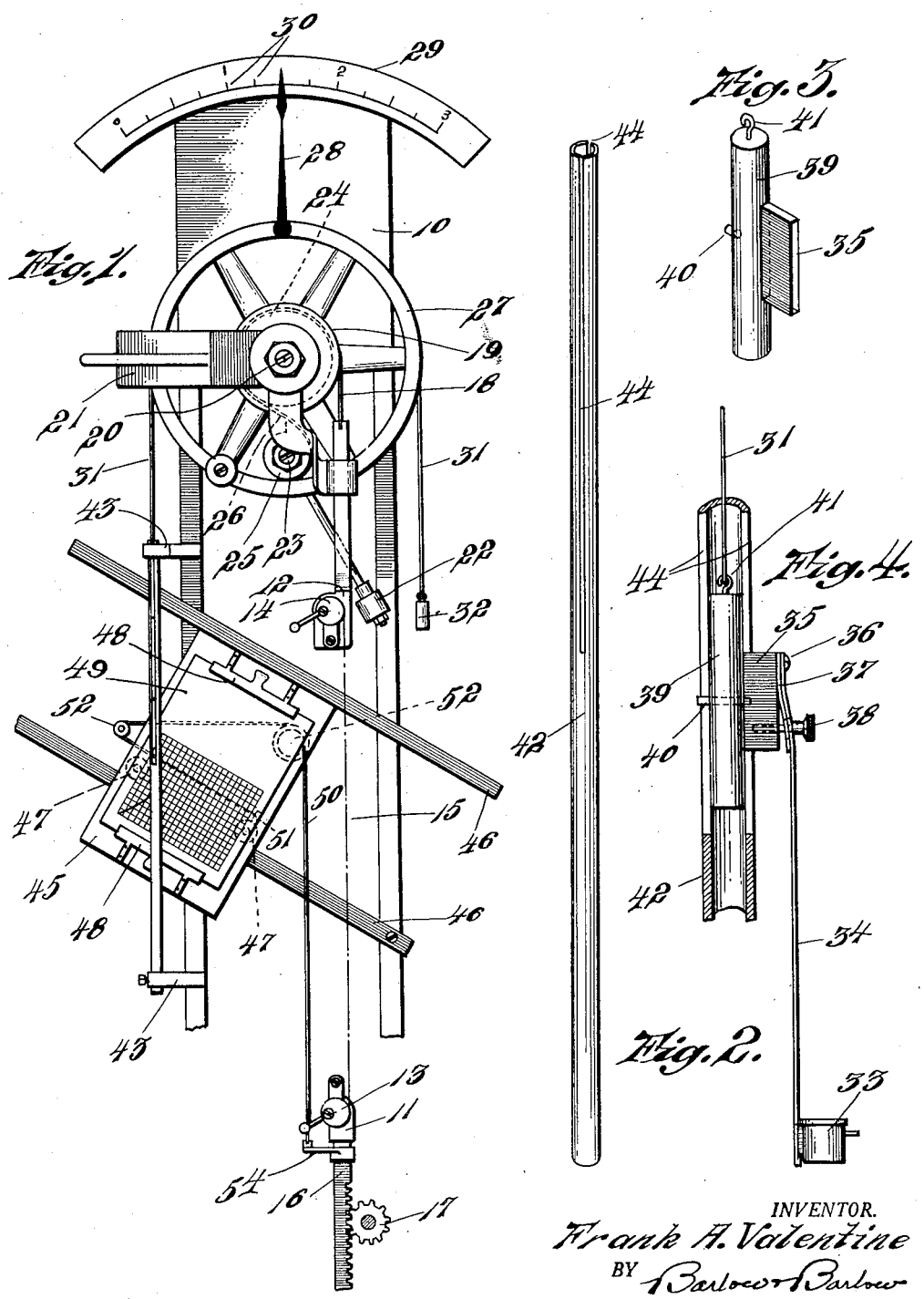

1,935,421

UNITED STATES PATENT OFFICE 1,935,421

TESTING MACHINE

Frank A. Valentine, Apponaug, R. I., assignor to Henry L. Scott Company, Providence, R. I., a corporation of Rhode Island Application October 19, 1929. Serial No. 400,933

2 Claims. (Cl. 234—1)

The present invention relates to testing machines, and has particular reference to recording mechanism for the same.

One object of the invention is to provide an improved recording mechanism having a minimum of frictional resistance.

Another object of the invention is to provide a recording mechanism having two relatively movable elements, one element being positively shiftable in accordance with the applied load, and the other element being positively shiftable in accordance with the strain produced in the test specimen.

Other objects and advantageous features will be readily apparent from the detailed description following, in conjunction with the accompanying drawing, and will be particularly specified in the appended claims.

Referring to the drawing:

Fig. 1 is a front elevation showing the mounting of the improved recording mechanism on a testing machine;

Fig. 2 is a perspective view of the vertical guide tube;

Fig. 3 is a perspective view of the recording instrument carrier; and

Fig. 4 is a detail, partly in section, showing the recording instrument mounted on the carrier.

It has been found desirable in testing machines operating under relatively light loads, to minimize the frictional resistance of the recording mechanism in order to obtain more accurate readings. I have devised a recording mechanism which includes a record holder mounted on roller bearings for lateral movement in accordance with the applied load, and a holder for a recording pen or the like which is guided for vertical movement with respect to the record holder and is balanced against the pull of gravity thereon; and the following is a detailed description of a preferred structural embodiment of the principles of my invention.

Referring to the drawing, the numeral 10 designates the framework of the testing machine, in the present instance illustrated as a tensile strength testing machine. A lower movable clamping jaw 11 and an upper floating clamping jaw 12 have hand operated clamps 13, 14 for securing a test specimen 15 therebetween. The lower jaw 11 is moved under action of the testing load by vertical rack 16 and rack pinion 17, which are operatively connected to the power transmitting gearing. The upper jaw 12 is connected by a flexible strap or the like 18 to a pulley 19 keyed to a shaft 20 rotatably supported in the framework 10 and a bearing arm 21 integral with the framework or secured thereto.

A pendulum weight 22 is keyed to a shaft 23, suitably rotatably mounted in the framework, and is swung to resist turning of the shaft 20 by movement of a pulley 24 keyed to the shaft 20, a cam 25 keyed to the shaft 23, and a flexible strap 26 secured at its ends to the periphery of the pulley 24 and the cam 25 respectively.

An indicator wheel 27 is also keyed to the shaft 20, and has a pointer 28 secured thereto which co-operates with a dial or scale 29 having equally spaced graduations 30 and secured in any desired manner to the framework 10. The wheel 27 has a grooved edge in which a flexible strap 31 is positioned, a recording instrument being secured at one end thereof, and a counterbalancing weight 32 at the other end thereof.

The recording instrument is shown in Figure 4 as a recording pen, and is designated as 33; it is releasably mounted on a thin metal strip 34, secured to a support and guide block 35 by a screw 36 or the like, a spring 37 normally forcing said strip away from the block, and an adjusting screw 38 retaining the strip, and therefore the recording pen, in adjusted position against the tension of the spring 37.

The block 35 is secured to, and forms part of, a guide cylinder 39, which has a guide pin 40 extending rearwardly therefrom, and a hook or other fastening device 41 at its upper portion to which the end of the flexible strap 31 may be detachably secured. The guide cylinder 39 is freely movable in a vertical tube 42, secured to the framework 10 by brackets 43, the tube having two aligned vertical slots 44 in which the guide pin 40 and the support block 35 reciprocate.

A record holder 45 is mounted for sliding engagement with two angle or channel rods 46 suitably secured to the framework 10, the record holder having two rollers 47 pivoted thereon and in rolling engagement with the lower channel rod 46. The record holder has the usual manually operated clips 48 for detachably securing a record sheet 49 thereon, and is moved by a flexible strap 50 secured to the record holder as at 51, and passing over guide roller 52 and idler pulley 53 to be attached to a bracket member 54 fastened to the rack 16 for joint movement therewith.

The operation of the improved mounting is as follows:

The application of testing force to the test specimen moves the rack 16 and thus causes a lateral displacement of the record holder and record sheet in exact correspondence to the force applied.

The resulting tension in the test specimen moves the shaft 20 and the pendulum weight 22, thus moving the indicator wheel 27 and causing the pointer 28 to indicate the force exerted. In addition, the movement of the indicator wheel 27 moves the strap 31, thus moving the recording pen 33 in a vertical direction; the pen therefore records the relative elongation of the test specimen on the record sheet as the record sheet moves in accordance with the application of the testing force.

My improved construction therefore minimizes friction, and increases the accuracy of test readings for light loads.

While I have described a specific embodiment of my invention, as applied to a tensile testing machine, it is obvious that desired changes in structure and arrangement to fit different types or kinds of testing machines may be made, within the scope of the invention, as defined in the appended claims.

I claim:

1. In a testing machine, a power clamp and a resistance clamp, a counterbalance weight, a rotatable wheel, a cylindrical guide for a recording instrument having two longitudinal guide slots, a recording instrument cylinder mounted in said guide for axial movement therein and having a guide element extending through one slot and a recording instrument base extending through the other slot, a flexible strap engaged by said wheel and connected at its ends respectively to the cylinder and the counterbalance weight, a recording instrument mounted on said base, and mechanism connecting said wheel to one clamp for rotation thereof upon movement of said clamp, whereby said flexible strap may be moved to shift the cylinder and the recording instrument.

2. In a testing machine, a power clamp and a resistance clamp, a recording instrument, a counterbalancing weight, a rotatable wheel, a flexible strap engaged by said wheel and having its ends respectively secured to the recording instrument and the counterbalancing weight, mechanism connecting said wheel to one clamp for rotation thereof upon movement of said clamp, whereby said flexible strap may be moved to move the recording instrument, means for resisting movement of the clamp, including a weight, a pulley coaxial with said wheel, and a strap connected to said weight and to said resistance clamp.

FRANK A. VALENTINE.